United States Patent [19]
Jackson et al.

[11] Patent Number: 5,460,098
[45] Date of Patent: Oct. 24, 1995

[54] AIR-CUSHION VEHICLE TRANSPORTATION SYSTEM

[75] Inventors: John D. Jackson, Las Vegas, Nev.; L. James Miller, Leo, Ind.

[73] Assignee: Levitated Transport Systems, Inc., Las Vegas, Nev.

[21] Appl. No.: 222,742

[22] Filed: Apr. 1, 1994

[51] Int. Cl.[6] ............................................. B60V 1/06
[52] U.S. Cl. ........................ 104/232; 104/124; 104/138.1
[58] Field of Search .................................. 104/23.2, 124, 104/138.1; 105/66, 365; 180/116, 117, 118

[56] References Cited

U.S. PATENT DOCUMENTS

| | | | |
|---|---|---|---|
| 3,100,454 | 8/1963 | Dennis | 104/23.2 X |
| 3,108,546 | 10/1963 | Hafner | 104/23.2 X |
| 3,213,802 | 10/1965 | Foa | 104/138.1 |
| 3,438,337 | 4/1969 | Edwards | 104/156 |
| 3,543,685 | 12/1970 | Rosciszewski | 104/23.2 |
| 3,548,969 | 12/1970 | Weston | 180/130 |
| 3,561,364 | 2/1971 | Giraud | 104/23.2 X |
| 3,724,690 | 4/1973 | Bates . | |
| 3,861,319 | 1/1975 | Gelhard et al. | 104/124 |
| 3,952,667 | 4/1976 | Kovanov et al. | 104/138.1 |
| 3,999,487 | 12/1976 | Valverde | 104/138.1 |
| 4,023,500 | 5/1977 | Diggs | 104/138.1 |
| 4,170,944 | 10/1979 | Zhukov et al. | 104/138.1 |
| 4,821,647 | 4/1989 | Powell et al. | 104/23.2 |
| 5,033,391 | 7/1991 | Watanabe | 104/23.2 |
| 5,096,012 | 3/1992 | Chia et al. | 180/117 |
| 5,105,898 | 4/1992 | Bixel, Jr. | 180/117 |
| 5,222,436 | 6/1993 | Coffey | 104/281 |

FOREIGN PATENT DOCUMENTS 684115 4/1964 Canada ............................. 104/138.1

*Primary Examiner*—Robert J. Oberleitner
*Assistant Examiner*—S. Joseph Morano
*Attorney, Agent, or Firm*—Baker & Daniels

[57] ABSTRACT

A land transportation system comprising a fully enclosed tubular guideway and a self-propelled air-cushion vehicle disposed in the guideway for providing short and long distance transportation within an enclosed environment. The tubular guideway is secured to stanchions anchored to underground concrete pilings. The air-cushion vehicle includes an internal cavity for receiving passengers and/or cargo holding containers. Air foils, air intake openings and air discharge openings are disposed throughout the cylindrical vehicle to create an air cushion between the vehicle and the guideway, that completely encircles the vehicle, thereby preventing the vehicle from engaging any surface within the tubular guideway during travel.

16 Claims, 4 Drawing Sheets

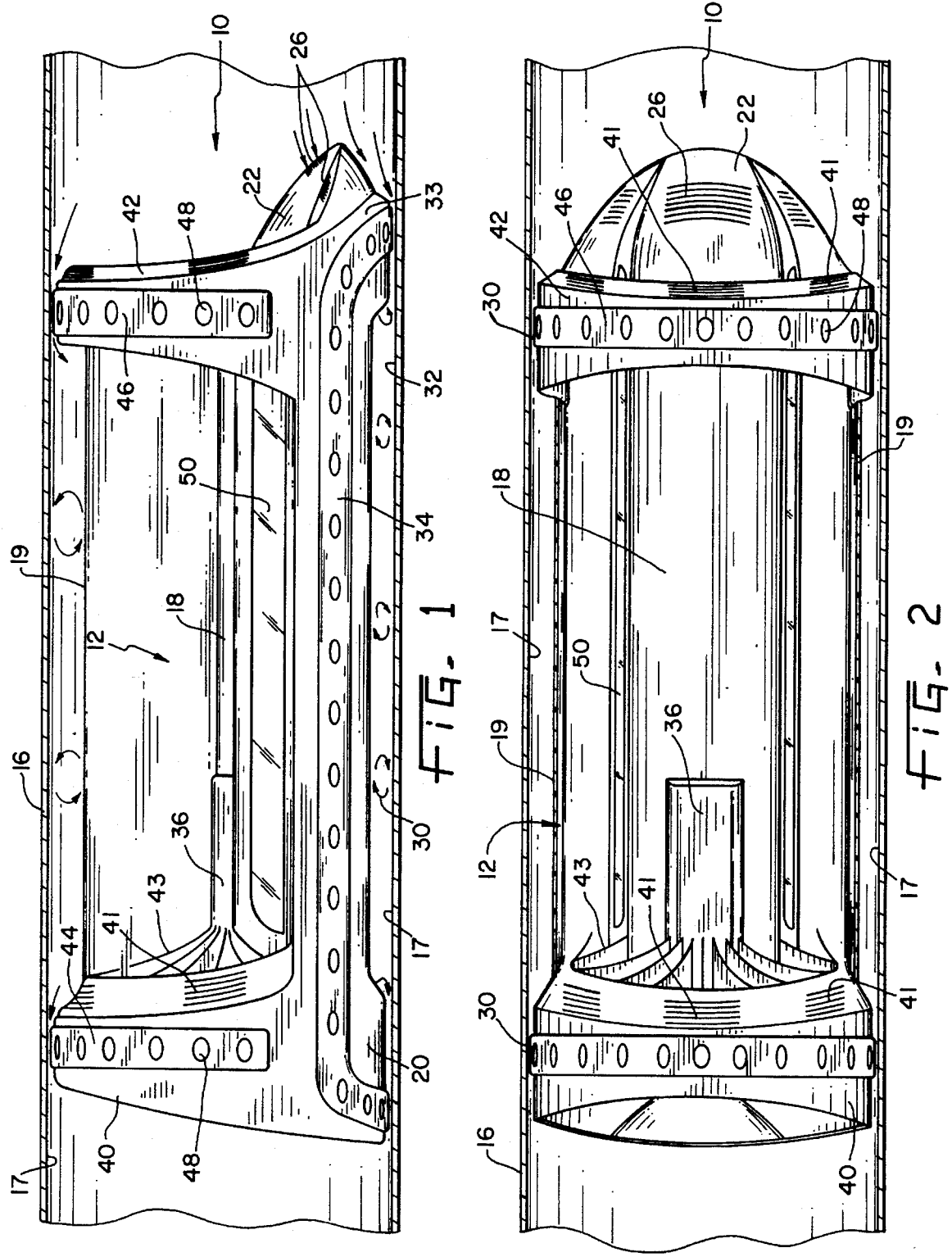

AIR-CUSHION VEHICLE TRANSPORTATION SYSTEM

BACKGROUND OF THE INVENTION

The present invention relates generally to levitated vehicle transportation systems and, more particularly, to a transportation system utilizing an air-cushion vehicle.

Transportation vehicles that operate on the principle of levitation are well-known in the art. For example, U.S. Pat. No. 5,222,436 discloses a propulsion system for magnetically levitated vehicles, which rely on a magnetic field to provide the force that overcomes the force of gravity resulting in levitation.

Another well-known type of vehicle the operates on the principle of levitation is an air-cushion vehicle, also known as a ground-effect machine (GEM) or a Hovercraft. These vehicles are raised slightly above the surface of travel by low-pressure, low-velocity air, which permits the vehicles to travel over surfaces such as water, ice, marsh or relatively level land. Conventionally, these vehicles are raised no more than a few feet above the surface of travel.

An example of a typical air-cushion vehicle is disclosed in U.S. Pat. No. 3,548,969. The vehicle disclosed in this patent is particularly designed for transporting oil on an offshore drilling rig. The vehicle includes a fan near the top of the vehicle. The fan forces a stream of air through an annular, vertical air passage, where the air is discharged in high velocity streams at the underside of the vehicle, thereby creating the air-cushion.

U.S. Pat. No. 5,096,012 discloses another type of air-cushion vehicle having a complicated system of directional and lift controls for maneuvering and operating the vehicle. U.S. Pat. No. 5,105,898 discloses yet another type of air-cushion vehicle designed to transport small to large cargos at high speeds over a body of water.

In addition to air-cushion vehicles, complete land transportation systems are also known in the art. For example, in U.S. Pat. No. 5,033,391, a transportation system is disclosed which generally consists of concrete pipe buried underneath the ground. A mobile box is movable within the underground pipe and includes wings that generate a buoyancy by a pneumatic effect when mobile box 11 moves. Guides are affixed to the center of the tube to cooperate with guide rollers on the box to stabilize the running of the box.

It is desired to provide a transportation system that is an improvement over prior art systems.

SUMMARY OF THE INVENTION

The present invention provides a transportation system comprising an air-cushion vehicle disposed within a transportation guideway, wherein a circumferential cushion of pressurized air is formed about the vehicle both during travel within the guideway and at rest to prevent the vehicle at all times from engaging the inner wall of the guideway and thereby eliminating surface friction between the vehicle and the guideway.

Generally, the invention provides in one form thereof a transportation support structure comprising a plurality of prefabricated tubular sections that are secured to one another to form a tubular guideway. A self-propelled air-cushion vehicle is disposed in the guideway and includes a plurality of air foils, air intake openings and air discharge openings about the vehicle. As the vehicle travels through the tubular guideway, the air passing over the air foils and exiting the discharge openings provides a regulated circumferential cushion of pressurized air about the vehicle, thereby preventing the vehicle from making contact with any surface of the tubular guideway. The air-cushion vehicle requires no rails or other guidance features because it is pneumatically centered within the guideway. Unlike conventional air-cushion vehicles, which only create an air cushion at the bottom of the vehicle, the air-cushion vehicle of the present invention includes an aerodynamic, circumferential design, along with air discharge openings completely around the vehicle which create a regulated circumferential air cushion that automatically centers the vehicle in the guideway.

An advantage of the transportation system of the present invention is that the air-cushion vehicle travels in a completely enclosed environment, thereby eliminating weather elements and foreign objects as impediments to travel.

Another advantage of the transportation system of the present invention is that the system can be installed into virtually any travel terrain and alleviates the need for expensive earth excavations and fills.

Another advantage of the transportation system of the present invention is that the tubular guideway structure is easily assembled and disassembled with minimal effect to the environment.

Yet another advantage of the transportation system of the present invention is that the vehicles in the tubular guideway can travel at high speeds compared to other forms of transportation without hazards such as weather, derailment, collision, and crashes due to mechanical and human error.

Still another advantage of the transportation system of the present invention is that the air-cushion guideway system offers an ecologically sound alternative to current land transportation vehicles, such as automobiles, buses, trucks, trains and airplanes which produce a large amount of undesirable emissions.

Yet another advantage of the transportation system of the present invention is that the prefabricated construction of the tubular guideway permits sections to be easily assembled and disassembled with minimum time constraints, enables flexibility and can be adapted to the rapidly changing technology of the transportation industry.

Yet another advantage of the transportation system of the present invention is that a circumferential cushion of pressurized air is formed about the vehicle preventing the vehicle from engaging and causing wear and tear on the tubular guideway, thereby permitting the guideway to be economically well maintained.

Still another advantage of the transportation system of the present invention is that safety hatches are located throughout the tubular guideway to permit both passenger and cargo to be easily accessed in the event of an emergency.

The present invention, comprises a land transportation system including an elongated hollow transportation shell having an inner surface defining a cavity therein. The hollow shell is anchored to a support member external of the shell. In one embodiment, an air-cushion vehicle is disposed in the cavity. The vehicle includes a means for generating a pressurized flow of air circumferentially about the vehicle. This flow of air generates an air-cushion between the vehicle and the inner surface of the shell to prevent the vehicle from engaging any portion of the inner shell surface during travel. The vehicle includes means for self-propelling the vehicle from a first location in the shell to a second location within the shell.

The present invention provides, in another form thereof, a method of transporting passengers and cargo from a first location to a second location in a vehicle that is in an enclosed environment. The method includes the step of loading a transport container, which may be adapted for passengers or cargo, into the cavity of an air-cushion vehicle that is disposed within an enclosed tubular guideway having no guide rails therein. The transport container connects to the central cavity and becomes an integrated part of the air-cushion vehicle. The transport containers are designed for various types of cargo. They may contain a plurality of seats for transporting passengers with their cargo, and they may also be designed for transporting other specialized cargo.

The air-cushion vehicle includes means for generating a pressurized flow of air circumferentially about the vehicle thereby generating a circumferential air-cushion between the vehicle and the inner surface of the tubular guideway. The propelling mechanism of the vehicle is then energized to cause the vehicle to move forward in the guideway in such a manner that no portion of the inner surface of the guideway is engaged by the vehicle. The vehicle is then stopped at a second location within the guideway. Access doors located on the vehicle and the transported container are detached and lowered from the central cavity of the vehicle. The transport container may then be opened and cargo unloaded.

BRIEF DESCRIPTION OF THE DRAWINGS

FIG. 1 is a side elevation view of an exemplary embodiment of the transportation system of the present invention, particularly showing a cylindrical air-cushion vehicle in a tubular guideway;

FIG. 2 is a plan view of the transportation system of FIG. 1;

DESCRIPTION OF THE PREFERRED EMBODIMENT

Figure 3:
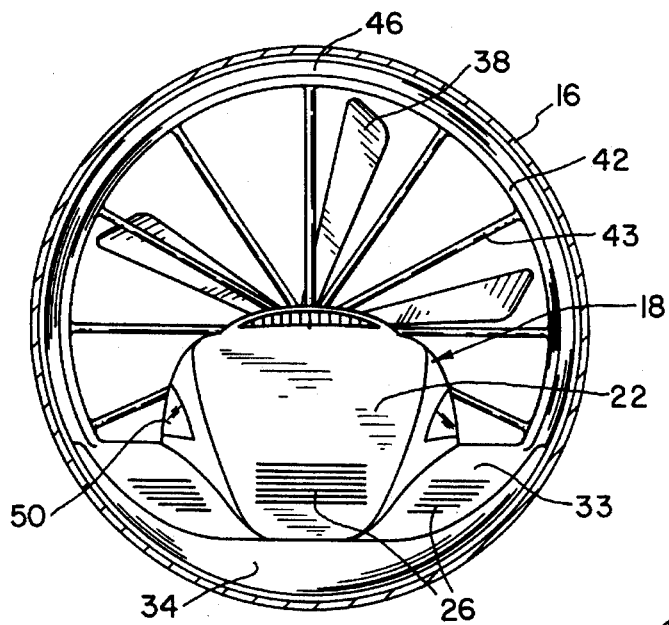
FIG. 3 is a front elevational view of the transportation system of FIG. 1.

Referring to FIGS. 1–5, an exemplary embodiment of an air-cushion vehicle transportation system 10 in accordance with principles of the present invention is shown and generally comprises an air-cushion vehicle or ground-effect machine 12 horizontally buoyed within a transportation support structure 14 (FIG. 7) including a transportation shell or tubular guideway 16. Although guideway 16 is tubular in shape, it may be one of a variety of geometric shapes. Preferably, tubular guideway 16 is made of composite or other lightweight and corrosion-free materials and may be transparent in part. As best shown in FIG. 2, air-cushion vehicle 12 is preferably cylindrical in shape for ease of movement through guideway 16 volume. Preferably, vehicle 12 is made of a lightweight high strength plastic material. Vehicle 12 comprises an elongated main body portion 18 with an outer cylindrical hull 19, which is preferably of an aerodynamic design and about one half the guideway 16 height. Hull 19 is preferably composed of a transparent polymethyl methacrylate, which is commercially available under the trade name Plexiglas, manufactured by Rohm and Haas. Main body 18 includes a central longitudinal cavity or compartment 18A (FIG. 6) for receiving transport containers which may be designed to accommodate various types of cargo including passengers. Access to internal cavity 21 of the transport container is preferably through doors 20 (FIG. 5) located at the bottom of vehicle 12; however, other modes of access are possible.

Referring to FIGS. 1, 2, 5, and 6, the airflow arrangement of vehicle 12 is illustrated. When the vehicle is in use, it is desirable that the vehicle be continuously surrounded by a cushion of air in order to avoid contact with tubular guideway 16. In order to generate this air cushion, there must be a flow of air. While the vehicle is travelling within guideway 16, a flow of air is naturally provided by aerodynamic design. However, in order to generate an air cushion while vehicle 12 is stopped or parked at a particular location within guideway 16, it is necessary for the vehicle to be able to create its own flow of air.

Figure 6:
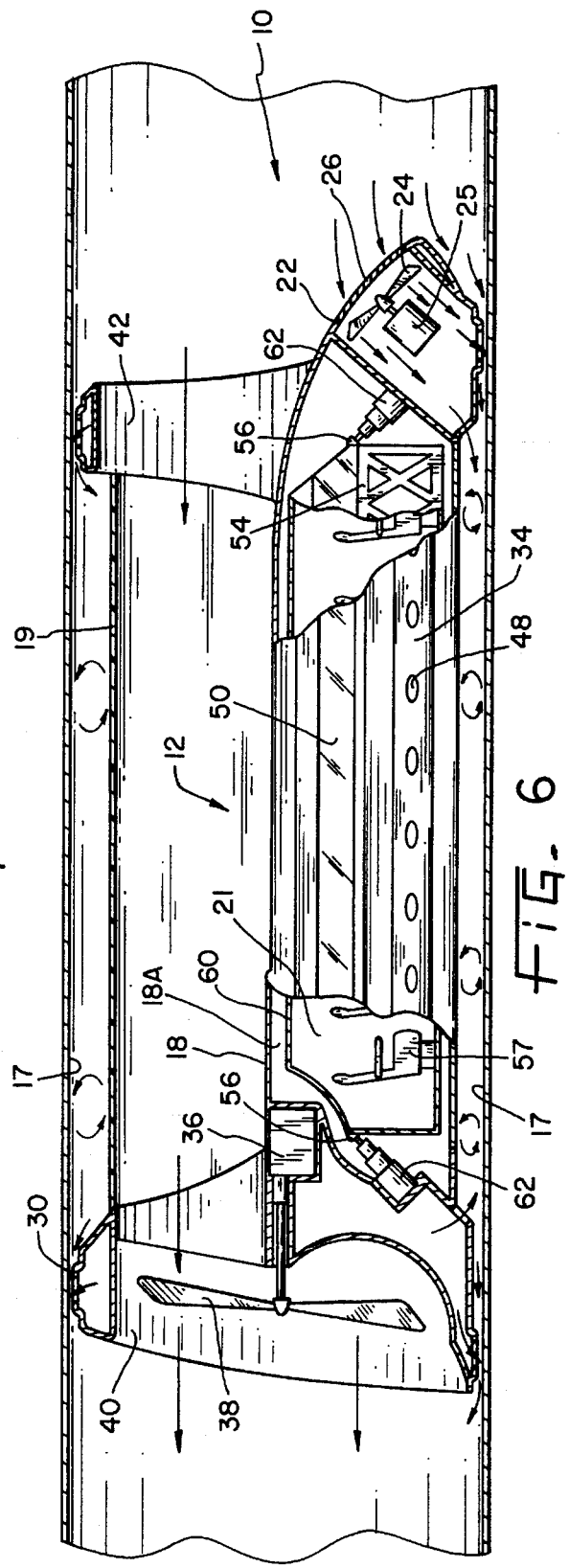
FIG. 6 is a view of the transportation system of FIG. 1, in partial section particularly showing the container system of the vehicle with its attachments, the vehicle lift system, and the vehicle propulsion system for lateral propulsion.

Referring to FIG. 6, the front end 22 of main body 18 includes an air lift impeller or fan 24 that draws air from air intake openings 26 located at the top of front end 22 and directs the air out through a plurality of air discharge openings (not shown) that are formed about the bottom of vehicle 12. Air intake openings 26 are in communication with an interior plenum (not shown) that extends throughout the length of main body 18 of vehicle 12. The air discharge openings include discharge openings 28 (FIG. 5) located at the bottom of vehicle 12 near access doors 20 and along air skirt 34.

Vehicle 12 further includes an air skirt 34 that is secured to main body 18 in a conventional manner. Skirt 34 is preferably made from a resilient, durable material such as nylon or the like, and is constructed to be readily yieldable. Skirt 34 includes a plurality of openings 48 therein. Openings 48 are in air communication with the air discharge openings in main body 18 so that as air is forced through the air discharge openings in the main body 18 of vehicle 12, pressurized air fills up the interior of skirt 34 and then discharges the pressurized air out through openings 48.

Referring again to FIGS. 1, 2, and 6, main body 18 includes an upstanding circular extension or ring 40 that extends from the rear of main body 18 and an upstanding circular extension or ring 42 that is formed at the front end portion of main body 18. Rear and front rings 40, 42 are attached to the outer cylindrical hull 19 to form an air plenum chamber around the entirety of the vehicle to increase the stability and provide the maximum benefits of air flow control while the vehicle 12 is in travel. As with main body 18, rings 40 and 42 include a plurality of intake openings (not shown) therein. In addition, each ring extension 40, 42 includes a respective air skirt attachment 44, 46 in air communication with these openings. Skirts 44, 46 separate the outer surfaces of the ring extensions 40 and 42 with their respective portions of inner wall 17 of guideway 16. Preferably, discharge openings 48 in the skirts are baffled and spaced apart from one another to provide consistent air pressure between the vehicle and inner surface of guideway with a regulated air flow and lifting effect.

As shown in FIGS. 1 and 2, the front surfaces of rings 40 and 42 include air intake openings 41 for drawing air into the interior plenums of rings 40 and 42. It will be appreciated that openings 41 are primarily operational while vehicle 12 is travelling through guideway 16.

In order to create an air cushion while vehicle 12 is stationary within tubular guideway 16, fan 24 is energized by power plant 25 thereby causing a flow of air to enter through air intake openings 26 into the lower air plenum of vehicle 12. The pressurized air then exits through both the openings in the plenum 28 and through openings 48 in the bottom skirt 34 to provide a circumferential air cushion 30 underneath the vehicle 12. Fan 24 is of sufficient strength to create a force of air such that the pressurized air discharged from openings 48 are sufficient to provide the lift necessary to raise vehicle 12 slightly within tubular guideway 16. In addition, the pressurized air flow exiting through openings 48 in skirts 44 and 46 prevents the periphery of wings 40 and 42 from engaging inner surface 17 of tubular guideway 16 while the vehicle is in motion.

Figure 4:
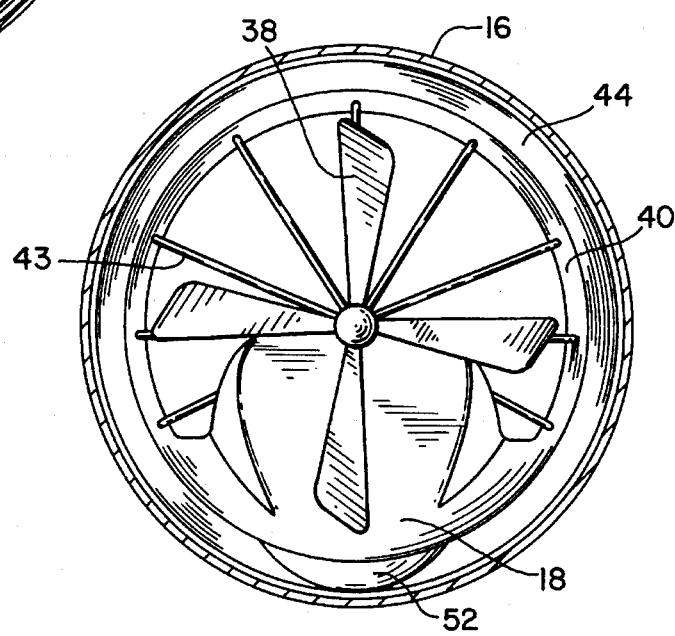
FIG. 4 is a rear elevational view of the transportation system of FIG. 1.
Figure 5:
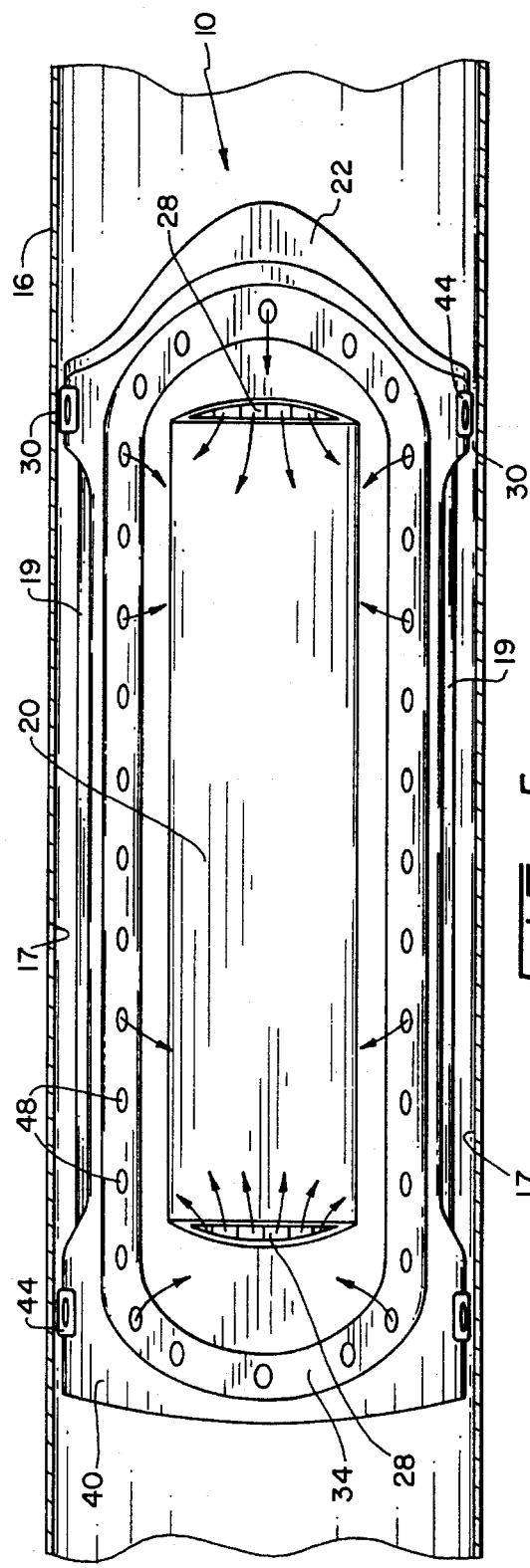
FIG. 5 is a bottom elevational view of the transportation system of FIG. 1.

As shown in FIGS. 2 and 6, a propulsion power plant 36 is mounted near the rear of vehicle 12 at the top of main body 18. Power plant 36 actuates a lateral propulsion fan 38 housed within ring 40. Referring to FIGS. 1 and 2 a series of air foils 43 extend from the rear end of main body 18 to ring 40. The air foils 43 are manipulated mechanically to adjust the position of vehicle 12 in the guideway during forward motion. Closure of the foils 43 effects a braking system as airflow through rings 40, 42 is restricted. This apparatus permits controlled braking of vehicle 20 within tubular guideway 16. If desired, front ring extension 42 may also be equipped with a closure apparatus (not shown) to further restrict air flow around the vehicle. Ring 40 and outer hull 19 connects to the fuselage of main body 18 at the point where the main body 18 meets the arc of the tubular guideway. As best shown in FIGS. 3 and 4, the outside surface diameters of both front and rear rings 40, 42, are slightly less than the respective inside surfaces of guideway 16.

Vehicle 12 may transport cargo as well as passenger containers. Outer cylindrical hull 19 may be transparent. Accordingly, main body 18 may include upper inside panels 50 that are transparent to permit passenger viewing during travel.

Referring to FIG. 4, the rear portion of vehicle 12 includes a docking apparatus 52 adapted to receive a second vehicle of the same kind for travel with multiple vehicles in train-like fashion.

Referring to FIG. 6, main body 18 includes a central cavity chamber 18A. Coupling members 56 which extend from within the central cavity chamber 18A engage corresponding coupling receptacles on transport container 60 (shown in closed position) for fastening air-cushion vehicle 12 and transport container 60 into a unitary body. Attachment mechanism includes hydraulic stabilizers 62.

Transport container 60 conforms in many respects to the standard cargo containers except that transport container 60 is designed to accommodate passengers and passenger cargo 54 and also has the capability of being connected with main body 18 to become an integral part thereof. Transport container 60 includes an internal rigidizing framework including upper and lower structural members. Container 60 also includes side access doors (not shown) for loading or unloading. A loading mechanism (not shown) loads transport container 60 into central cavity 18A through access doors 20 located in the bottom of main body portion 18 of vehicle 12, while vehicle 12 is situated adjacent the loading doors in tubular guideway 16. Preferably, container 60 is mechanically lifted and attached to inside central cavity chamber 18A of vehicle 12. With the access doors to cavity chamber 18A closed, the vehicle is prepared for transport. The ease of loading and unloading container 60 enables a rapid cargo transfer system to be implemented.

Figure 7:
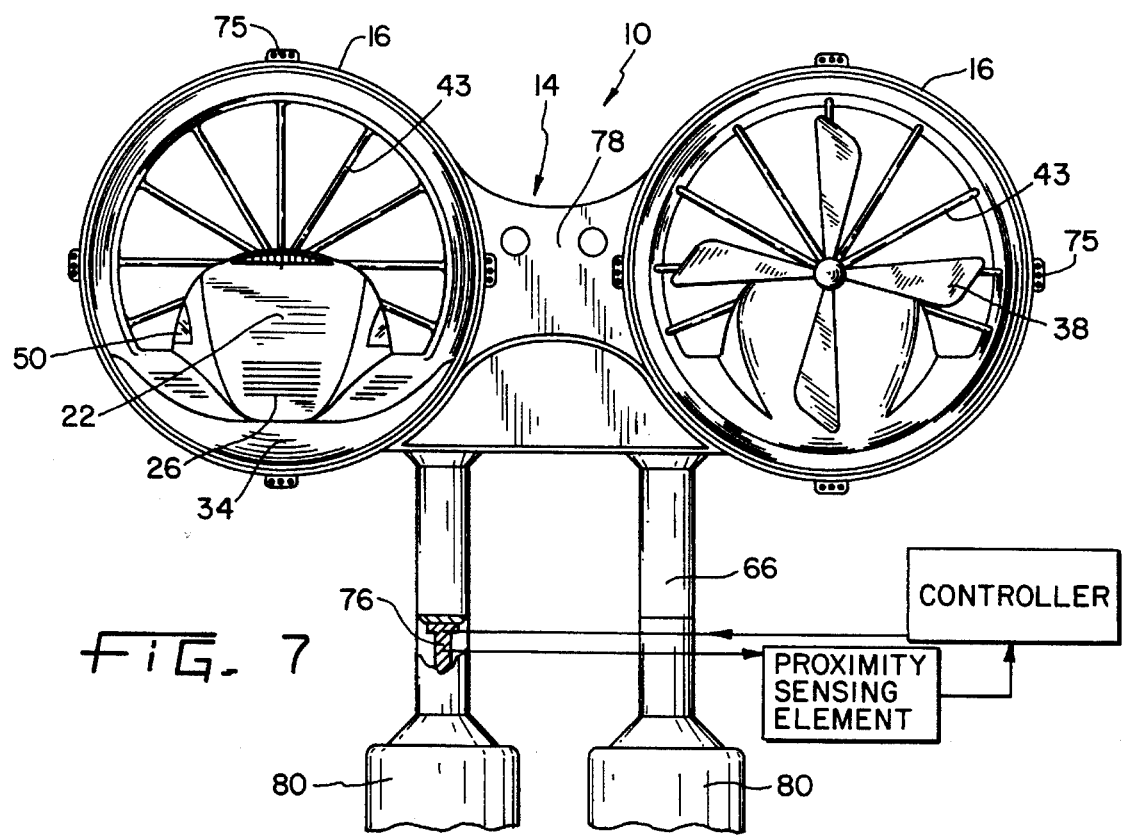
FIG. 7 is a sectional view of the dual tubular guideway system, particularly showing the tubular guideway with its columnar support, cantilevered ring and hydraulic height adjusting system.
Figure 8:
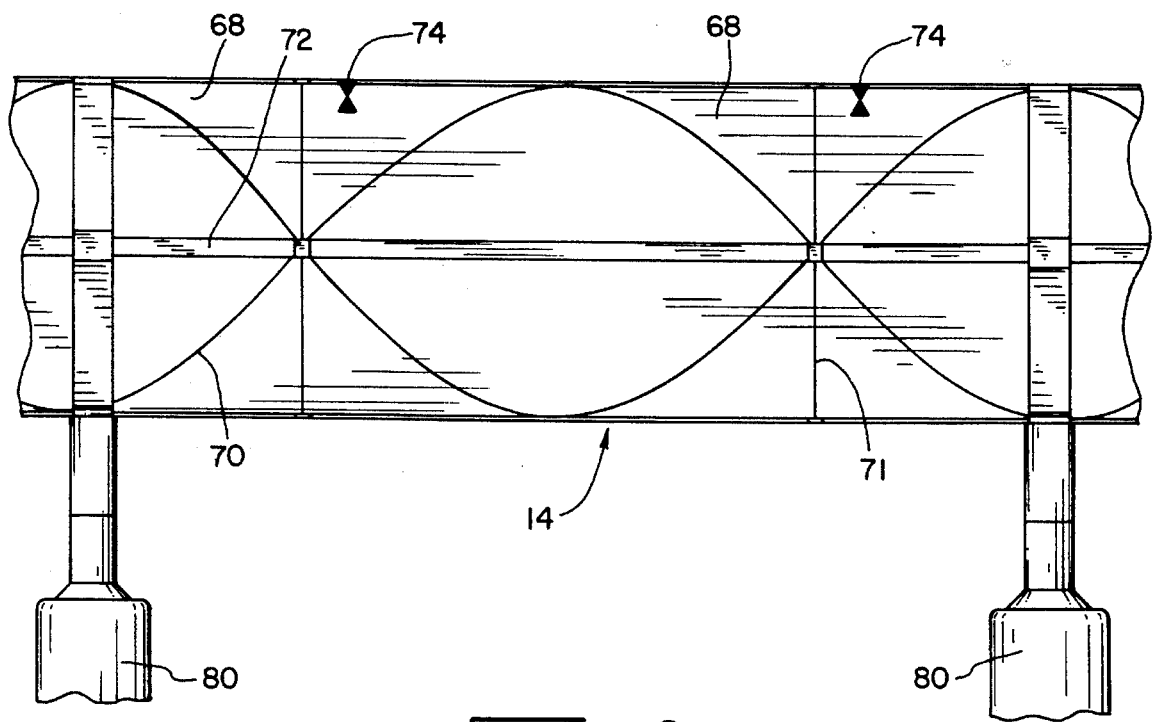
FIG. 8 is a side elevational view of the guideway system of FIG. 7, including post-tensioned modular guideway sections, columnar stanchions, and stanchion-guideway attachment apparatus.

Referring to FIGS. 7 and 8, the support structure 14 of the transportation system 10 is shown in greater detail. In particular, tubular guideway 16 is supported by columnar supports or stanchions 66 above ground. Tubular guideway 16 is preferably divided into prefabricated sections 68 attached to one another by transverse 70, 71 and longitudinal 72 cables housed in ducts 75 utilizing a post tensioning method. All or portions of the guideway sections 68 may be transparent. Prefabricated sections 68, when attached to one another with post-tensioned cables, comprises the tubular guideway structure 16 including a concave surface, emergency access hatches, and suitable ventilation valves 74. Preferably, loading areas (not shown) are incorporated into the bottom portion of guideway 16 to provide loading access doors for loading and unloading of transport container 60.

As shown in FIG. 7, the above ground guideway construction includes stanchions 66 with hydraulic height adjustment mechanisms 76. Preferably, mechanisms 76 utilize a sensor such as a laser or other alignment or proximity sensing element that emits a signal when tubular guideway 16 is out of alignment. In such an instance, each stanchion 66 may be automatically adjusted, thereby providing optimal performance for vehicles 12.

Stanchions 66 attach to guideways 16 in cantilevered fashion with locking rings 78. The base 80 of each stanchion 66 is preferably made of a concrete piling 80. Shock absorbers (not shown) may also be included as part of the stanchion assembly to dampen vibrations. These adjustments would stabilize conditions if the bases 80 of stanchions 66 shift due to changes in the moisture content of the ground, freezing and other variables that could cause geological instability.

Preferably, there are only four types of materials needed for construction of the tubular guideway: (1) a plurality of prefabricated tubular sections such as fitted composite sections, with internal ducts for cables, which are easily transported and assembled on site either above ground or below ground; (2) longitudinal and transverse post tension cables for securing the individual sections together; (3) a pier assembly with cantilevered locking rings anchored to the tubular guideway; and (4) underground concrete pilings.

In some situations (e.g., urban areas, mountains, etc.) tubular prefabricated sections 68 may be more economically assembled in excavated areas or other underground facilities rather than being above ground as shown here. Although a preferred vehicle is an air-cushion vehicle, other types of vehicles may be used in this unique tubular guideway construction.

It should be noted that operators within the vehicles are not necessarily required since the vehicles may be adapted to be automatically controlled at predetermined locations within the transportation guideway. It is thus appreciated that the present invention provides a complete and automated transportation system in which a vehicle is transported in an enclosed guideway between cities and towns or within cities.

It will be appreciated that the foregoing is presented by way of illustration only, and not by way of any limitation, and that various alternatives and modifications may be made to the illustrated embodiment without departing from the spirit and scope of the invention.

What is claimed is:

1. A land transportation system comprising:

an enclosed elongated hollow shell having an inner surface defining a cavity therein;

means for anchoring said shell to a supporting member external of said shell; and a self-propelled vehicle in said cavity and including a first enlarged diameter section in spaced relationship with said inner surface, a second enlarged diameter section in spaced relationship with said inner surface, and a reduced diameter section formed therebetween to define a plenum chamber so that while said vehicle is in motion, air flowing around said first enlarged diameter section is captured in said plenum chamber to create an air cushion between said vehicle and said shell to prevent said vehicle from engaging any portion of said inner shell surface.

2. The land transportation system of claim 1, wherein said shell is a tubular guideway.

3. The land transportation system of claim 1, wherein said shell comprises a plurality of prefabricated components secured to one another by at least one post-tensioned cable.

4. The land transportation system of claim 1, wherein said anchoring means comprises a plurality of longitudinal supports secured to said shell and anchored into said supporting member by concrete pilings.

5. The land transportation system of claim 4, wherein each of said longitudinal supports includes a height adjusting mechanism therein.

6. The land transportation system of claim 5, wherein said height adjusting mechanism is a proximity sensing element that emits a signal to a controller when said shell is out of alignment, wherein said controller then emits a signal to a mechanical height adjuster located on said longitudinal support.

7. The land transportation system of claim 1, wherein at least a portion of said shell is anchored underground.

8. The land transportation system of claim 1, including a plurality of air ventilation valves located throughout the length of said shell.

9. The land transportation system of claim 1, wherein said air-cushion vehicle is generally cylindrical in shape.

10. The land transportation system of claim 1, wherein said air-cushion vehicle central cavity is designed to accommodate a transport container which may house a plurality of passenger seats thereby enabling said air-cushion vehicle to transport passengers.

11. The land transportation system of claim 1, wherein a transport container which may be designed to accommodate passengers is secured within said cavity.

12. The land transportation system of claim 1, wherein said air-cushion vehicle includes a plurality of air inlet openings and a plurality of air outlet openings in air communication with said inlet openings, wherein said vehicle further includes an impeller for creating a flow of air from said inlet openings to said outlet openings, said flow of air through said outlet openings being sufficiently pressurized to create an air cushion between said vehicle and said shell while said vehicle is not being propelled.

13. The land transportation system of claim 1 wherein said vehicle is cylindrical in shape and wherein a cylindrical hull forms said plenum chamber around the entirety of the vehicle.

14. A land transportation system comprising:

a hollow tubular guideway having an inner surface defining a cavity therein;

a plurality of upstanding supports secured to said tubular guideway and being anchored underground; and a self-propelled vehicle in said cavity and including a first enlarged diameter section in spaced relationship with said inner surface, a second enlarged diameter section in spaced relationship with said shell, and a reduced diameter section formed therebetween to define a plenum chamber so that while said vehicle is in motion, air flowing around said first enlarged diameter section is captured in said plenum chamber to create an air cushion between said vehicle and said shell to prevent said vehicle from engaging any portion of said inner shell surface, said vehicle including a plurality of air foils, air intake openings and air discharge openings therein, wherein a plurality of passageways are formed throughout said vehicle to permit air communication between said intake and discharge openings;

said air foils and air discharge openings being disposed completely around the circumference of said vehicle such that the flow of air from said air foils and intake openings through said plurality of passageways and out said discharge openings generates a pressurized air cushion within said plenum chamber between said vehicle and said guideway, thereby preventing any contact between said vehicle and said guideway.

15. The land transportation system of claim 14, wherein said vehicle includes an impeller for creating a self-generated flow of air from said intake openings to said discharge openings, said self-generated flow of air through said discharge openings being sufficiently pressurized to create said pressurized air cushion between said vehicle and said guideway while said vehicle is not moving with respect to said guideway.

16. A method of transporting passengers from a first location to a second location in a vehicle that is in an enclosed environment, the method comprising the steps of:

loading passengers into a transport container to be transported within a cavity of an air-cushion vehicle disposed at a first location within an enclosed elongated tubular guideway having no guiderails therein, wherein the cavity includes attachment devices for receiving the transport container therein and wherein the air-cushion vehicle includes means for generating a pressurized flow of air circumferentially about the vehicle thereby generating a circumferential air cushion between the vehicle and an inner surface of the tubular guideway;

energizing a propelling mechanism on the vehicle to cause the vehicle to move forward in the guideway in such a manner that no portion of the inner surface of the guideway is engaged by the vehicle;

stopping the vehicle at a second location within the guideway; and detaching and removing the transport container from the cavity of the vehicle.

* * * * *